(12) United States Patent
Satcher, Jr. et al.

(10) Patent No.: US 6,613,809 B2
(45) Date of Patent: Sep. 2, 2003

(54) METAL-DOPED ORGANIC GELS AND METHOD THEREOF

(75) Inventors: Joe H. Satcher, Jr., Patterson, CA (US); Theodore F. Baumann, Tracy, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/132,783

(22) Filed: Apr. 24, 2002

(65) Prior Publication Data

US 2003/0100619 A1 May 29, 2003

Related U.S. Application Data

(60) Provisional application No. 60/334,023, filed on Nov. 28, 2001.

(51) Int. Cl.⁷ .................................................. C08J 2/30
(52) U.S. Cl. .......................... 521/35; 521/180; 521/181; 521/188; 521/153
(58) Field of Search .......................... 521/35, 188, 180, 521/181, 153

(56) References Cited

U.S. PATENT DOCUMENTS

| 5,366,828 A | | 11/1994 | Struthers |
| 5,908,896 A | * | 6/1999 | Mayer et al. |

FOREIGN PATENT DOCUMENTS

| WO | WO99/12870 A1 | 3/1999 |

* cited by examiner

*Primary Examiner*—Morton Foelak
(74) *Attorney, Agent, or Firm*—Ann Lee; Alan H. Thompson

(57) ABSTRACT

Disclosed herein is a sol-gel polymerization process for synthesizing metal-doped organic gels. The process polymerizes metal salts of hydroxylated benzenes or hydroxylated benzene derivatives with alkyl or aryl aldehydes to form metal-doped, wet, organic gels. The gels can then be dried by supercritical solvent extraction to form metal-doped aerogels or by evaporation to form metal-doped xerogels. The aerogels and xerogels can then be pyrolyzed.

14 Claims, 1 Drawing Sheet

METAL-DOPED ORGANIC GELS AND METHOD THEREOF

RELATED APPLICATION

This application claims priority in provisional application filed on Nov. 28, 2001, entitled "Metal-doped Organic Aerogels and Method Thereof" Ser. No. 60/334,023, by inventor(s) Theodore F. Baumann and Joseph H. Satcher.

The United States Government has rights in this invention pursuant to Contract No. W-7405-ENG-48 between the United States Department of Energy and the University of California for the operation of Lawrence Livermore National Laboratory.

BACKGROUND OF THE INVENTION

Aerogels are a special class of open-cell foams derived from highly cross-linked inorganic or organic gels that are dried using special techniques to preserve the tenuous solid network. These materials have ultra fine cell/pore sizes, continuous porosity, high surface area, and a microstructure composed of interconnected colloidal-like particles or polymeric chains with characteristic diameters of 100Å. This microstructure is responsible for the unusual optical, acoustical, thermal, and mechanical properties of aerogels. These materials are prepared through the sol-gel process and can be either granular or monolithic.

Organic aerogels are typically prepared from the sol-gel polymerization of resorcinol and formaldehyde and are dried through supercritical extraction of the reaction solvent. Recent efforts have focused on the ability to tailor the bulk properties of organic aerogels for specific applications. One area of interest is the design of carbon aerogels containing different dopants, such as metal ions. For example, a recent article in Advanced Materials 2000, 12, No. 21, November 2 by Bekyarova and Kaneko shows that Carbon aerogels with controlled porosity can be obtained by doping the resorcinol-formaldehyde reaction mixture with Ce and/or Zr by adding $Ce(NO_3)_3$ or $ZrO(NO_3)_2$ to an aqueous solution of resorcinol and formaldehyde. These researchers found that "not only the initial pH of the solution, but also the nature of the dopant metal, affects the sol-gel chemistry and thus the structure [of the resulting carbon aerogels]. The surface area of the Ce,Zr-doped carbon aerogels ranges from 500 to 800 $m^2g^{-1}$, the micropore volume is between 0.17 and 0.20 $m^3g^{-1}$, and the micropore size is 0.7 nm."

Other researchers have synthesized carbon aerogels containing transition metals for the purpose of catalyzing graphitization reactions producing unique carbon structures. For example, Maldonado-Hodar et al in a recent article in Langmuir 2000,16, 4367–4373, describe a method to synthesize Cr—, Fe—, Co—, and Ni—containing carbon aerogels by dissolving resorcinol and formaldehyde in water and adding either chromium nitrate, iron acetate, cobalt acetate or nickel acetate to the solution. The metal content of these carbon aerogels ranged from 1.4 to 5.4%. See Maldonado-Hodar et al, pg. 4368, Table 2.

Metal-doped carbon aerogels have potential technical applications in capacitors, batteries, catalysts and adsorbants.

SUMMARY OF THE INVENTION

Aspects of the invention include a process for synthesizing metal-doped organic gels comprising polymerizing a metal salt of a hydroxylated benzene or a hydroxylated benzene derivative with an aldehyde, wherein said polymerization is a sol-gel polymerization, to form a metal-doped, wet, organic gel.

Another aspect of the invention includes a process for synthesizing metal-doped organic gels comprising polymerizing a metal salt of a hydroxylated benzene or a hydroxylated benzene derivative with an aldehyde, wherein the polymerization is a sol-gel polymerization, to form a first metal-doped, wet, organic gel, and exchanging the first metal ion contained in the first metal-doped, wet, organic gel for at least one second metal ion using an ion exchange process to form a second metal-doped, wet, organic gel.

DETAILED DESCRIPTION OF THE INVENTION

Figure 1:
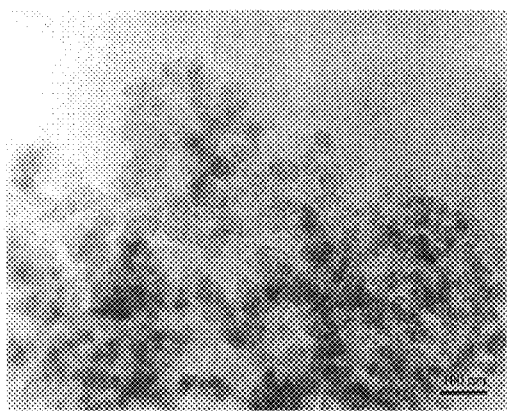
FIG. 1 shows a TEM photograph of $Cu^{2+}$-doped organic aerogel.

Described herein is a synthetic method for the preparation of metal-doped organic gels, which can then be dried and pyrolized to form carbonized aerogels and xerogels. Using a procedure analogous to the preparation of resorcinol-formaldehyde (RF) aerogels, described in Pekala, R. W. J. Mater. Sci. 1989, 24, 3221, which is hereby incorporated by reference, this approach generates metal-doped organic gels that can be dried using either supercritical solvent extraction to generate new organic aerogels containing a variety of metal ions or evaporation to generate new organic xerogels containing a variety of metal ions. The dried metal-doped organic gels can then be carbonized by heating under an inert atmosphere to form carbonized metal-doped carbon aerogels and xerogels. Heating to about 1050° C. for about 1 hour is an effective carbonization procedure.

Hereinafter the word "treated" refers to the process of soaking the gels in a solution for about 24 hours. The phrase "treated twice" refers to the process of soaking the gels in a solution for about 24 hours, then removing the gels and placing them into a fresh batch of the same type of solution for about 24 hours. "Treated three times" refers to the process of soaking the gels in a solution for about 24 hours, removing the gels and placing them into a fresh batch of the same type of solution for about 24 hours, then removing the gels and placing them into another fresh batch of the same type of solution for about 24 hours.

Our method of forming metal-doped organic gels involves a sol-gel polymerization of a metal salt, e.g., Sodium or Potassium (although other metals should work just as well) salts of hydroxylated benzenes (such as phenol, catechol, resorcinol, hydroquinone, phloroglucinol) and hydroxylated benzene derivatives (such as the carboxylic acid derivatives of compounds listed above), with an alkyl or aryl aldehyde, e.g. formaldehyde, acetaldehyde, propionaldehyde, benzaldehyde, glutaraldehyde, to produce a metal-doped, wet, organic gel. The polymerization can then be followed by an ion exchange process to introduce a particular metal or metals into the wet organic gel. For example, if a sodium or potassium salt of a hydroxylated benzene or a hydroxylated benzene derivative was used, the sodium or potassium ions can be exchanged for most metal ions, e.g., first row, second row or third row transition metals, at this point enabling the generation of a variety of metal-doped organic gels. The metal-doped, wet, organic gels can then be dried by supercritical solvent extraction or evaporation and then carbonized to generate carbonized organic gels containing metal species. Some metal ions may be reduced to lower oxidation states during the pyrolysis.

Typically, potassium carbonate (or any base that has a metal as a cation) is added to neutralize a suspension the hydroxylated benzene or hydroxylated benzene derivative metal salt, e.g., 2, 4 dihydtroxybenzoic acid, in an excess of water. When the acid is neutralized, the solution becomes clear. Once neutralized, an appropriate amount (based on the amount of metal salt) of an aldehyde, e.g., formaldehyde and a catalytic amount of a base, e.g., $K_2CO_3$, are added to the reaction. The reaction mixture is stirred to make the solution homogeneous. The solution remains clear and is poured into glass vials, which are sealed and stored at elevated temperatures (between about 70–90° C. until gelation occurs. Gelation time is qualitatively defined as the point at which the solution ceases to discernibly flow under the influence of gravity. After cooling to room temperature, the wet gels are then treated twice with de-ionized water prior to any ion exchange process. To exchange the sodium or potassium ions for other metals, the gels are typically treated three times with about a 0.1 M aqueous solution of the desired metal nitrate salt. Following ion exchange, the gels are treated twice with de-ionized water, then treated three times with acetone prior to drying. The gels can then be dried using carbon dioxide supercritical extraction or evaporation and carbonized. Heating for about 1 hour at about 1050° C. under an inert gas atmosphere, e.g., nitrogen, generates carbonized metal-doped organic gel materials. Organic aerogels with densities in the range of about 200 g/cm$^3$ to about 250 g/cm$^3$ and, following pyrolysis, carbonized organic aerogels with densities that ranged from about 350 g/cm$^3$ to about 400 g/cm$^3$ have been produced by the method just described.

Since this synthesis is general, it can be extended to incorporate many different metal ions or metal nanoparticles into the organic gel framework. First, second, and third row transition metals are particularly suitable for incorporation as nanoparticles using this method. Nanoparticles as used herein refers to clusters of atoms on the nanometer size scale. Generally metal clusters are observed after the metal ions are reduced to an oxidation state of zero.

In addition to ion-exchange as a method for introducing metals into the aerogel, metal ions can also be incorporated into the gel network through the sol-gel polymerization of metal complexes that contain hydroxylated benzenes or hydroxylated benzene derivatives as the primary ligand. The metal complex can then be reacted directly with an alkyl or aryl aldehyde, e.g., formaldehyde, acetaldehyde, propionaldehyde, benzaldehyde, and glutaraldehyde, to produce a metal-doped organic gel, bypassing the ion exchange step.

EXAMPLES

Example 1

Cu-doped Carbonized Aerogels 1.29 g (0.0094 mol) of potassium carbonate was added to a suspension of 2.9 g (0.018 mol) 2,4-dihydroxybenzoic acid in 100 ml of water. As the benzoic acid was neutralized, the solution cleared. Once neutralized, 2.98 g (0.054 mol) of 37% formaldehyde and 25 mg (0.178 mmol) of $K_2CO_3$, a base catalyst, were added to the reaction. The reaction mixture was stirred vigorously at room temperature for 30 minutes. The clear solution was then poured into glass vials, which were sealed and allowed to sit at room temperature for 12 hours before being cured at 80° C. for three days during which time dark orange, wet organic gels formed.

The wet organic gels were treated twice with de-ionized water, then treated three times with a 0.1 M solution of copper nitrate, $Cu(NO_3)_2$, resulting in organic gels containing $Cu^{2+}$ ions, referred to below in Table 1 as organic aerogel sample A. Following the ion exchange process, the gels were treated twice with de-ionized water, then treated three times with acetone to remove the water and then dried using carbon dioxide supercritical extraction. These gels were then carbonized at 1050° C. under a nitrogen atmosphere for 1 hour. This process produced a Cu-doped carbonized organic aerogel material, referred to in Table 1 below as carbonized aerogel sample A. The same process was used, excluding the ion exchange step, to produce a "blank" aerogel material, referred to in Table 1 below as organic aerogel sample B and a carbonized organic aerogel referred to below as carbonized aerogel sample B. The results shown in Table 1 and seen in FIGS. 1–3 demonstrate that carbonized organic aerogels containing a uniform dispersion of copper nanoparticles can be produced.

Elemental analysis, Brunauer-Emmett-Teller (BET) surface area analysis and Transmission Electron Microscopy (TEM) are the main techniques used to characterize the metal-doped organic gels. Elemental analysis results showed that the potassium-doped organic aerogels contained 6.07% potassium and the carbonized aerogels contained 4.17% potassium. Following ion exchange with $Cu(NO_3)_2$, the Cu-doped organic aerogels showed a copper content of 4.44% and the carbonized Cu-doped aerogels showed a copper content of 9.25%. In addition, elemental analysis on the Cu-loaded aerogels showed that very little potassium (less than 1%) remained in the gel following ion-exchange. The elemental compositions of these aerogel samples were qualitatively confirmed by X-ray photoelectron spectroscopy.

The surface areas and pore volumes of the aerogel samples were determined through nitrogen adsorption/desorption methods and calculated using BET and BJH (Barrett-Joyner-Halenda) theory. From this data, surface areas for the potassium-doped gels were about 616.4 m$^2$/g (pre-carbonized) and about 487.1 m$^2$/g (carbonized). The surface areas for the Cu-loaded aerogels were very similar for both the pre-carbonized and carbonized materials at, about 712.2 m$^2$/g and about 711.9 m$^2$/g respectively. The Cu-doped carbonized aerogels had a pore volume of about 2.17 cm$^3$/g and an average pore diameter of about 14.812 nm.

The microstructure of the Cu-loaded aerogel samples were investigated by transmission electron microscopy (TEM). Qualitatively, the TEM of the pre-carbonized $Cu^{2+}$-doped aerogel show that the material is composed of carbon nanoparticles that define the nanoporous network (FIG. 1). The carbon nanoparticles range in diameter from about 15 nm to about 30 nm. The potassium-loaded aerogel (not shown) has a nearly identical carbon framework as that shown in FIG. 1. From the TEM no visible copper particles are found, indicating that the copper ions are uniformly and molecularly dispersed throughout the aerogel.

Figure 2:
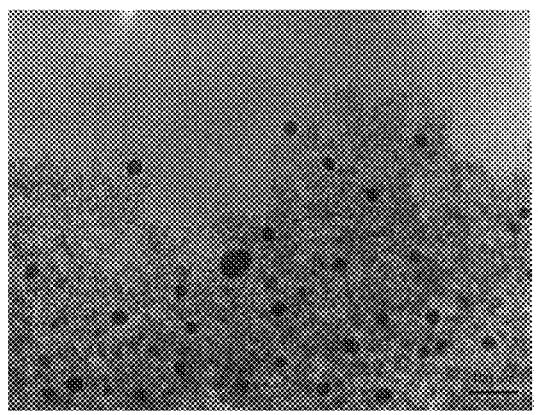
FIG. 2 shows a TEM photograph of Cu-doped carbonized aerogel.

When the organic aerogels were carbonized at about 1050° C., the carbonaceous particles were reduced in size to between about 10 nm to about 15 nm and the nanopores became more easily seen (FIG. 2). The TEM shows single crystal copper nanoparticles dispersed throughout the carbonized aerogel, ranging in size from about 10 nm to about 30 nm.

Figure 3:
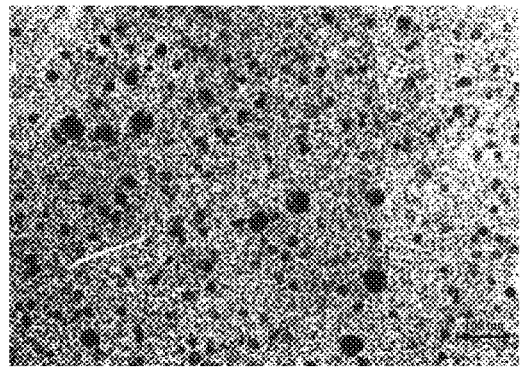
FIG. 3 shows a TEM photograph of Cu-doped carbonized aerogel.

When the amount of copper introduced into the organic aerogel is increased, the size of the single crystal copper nanoparticles in the resulting carbonized aerogel also increases with some of the particles approaching the 40 nm to 50 nm range (FIG. 3). The carbonized aerogel shown in FIG. 3 was prepared exactly like the ones described in Example 1 and shown in FIGS. 1 and 2 except that instead of pouring the reaction mixture into glass vials to cure it, the mixture was poured into glass petri dishes which are thinner than the glass vials, and thus allowed more copper ions to be exchanged for potassium ions. In contrast, no reduced potassium clusters were observed after pyrolysis (carbonization) of the $K^+$-loaded organic aerogels. This observation is most likely due to the high reduction potential of potassium, i.e., it is unlikely that the potassium atoms could be reduced to an oxidation of zero to form single crystal nanoparticles.

12 hours before being cured at 80° C. for three days during which time dark orange wet organic gels formed.

The wet gels were treated twice with de-ionized water and treated three times with a 0.1 M solution of copper nitrate, $Ni(NO_3)_2$, resulting in organic gels containing $Ni^{2+}$ ions. Following the ion exchange process, the gels were treated twice with de-ionized water, then treated three times with acetone and then dried using carbon dioxide supercritical extraction. These gels were then carbonized at 1050° C. under a nitrogen atmosphere for 1 hour. This process produced a Ni-doped carbonized aerogel material.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

TABLE 1

| Sample | | % K | % Cu | Surface Area | Pore Volume | Average Pore Diameter | Carbon Nano-particle Diameter | Metal Nano-particle Diameter |
|---|---|---|---|---|---|---|---|---|
| Organic Aerogels | A | <1% | 4.44% | 712.2 m$^2$/g | — | — | 15–30 nm | — |
| | B | 6.07% | — | 616.4 m$^2$/g | — | — | — | — |
| Carbonized Aerogels | A | <1% | 9.25% | 711.9 m$^2$/g | 2.17 cm$^3$/g | 14.812 nm | 10–30 nm | 40–50 nm |
| | B | 4.17% | — | 487.1 m$^2$/g | — | — | — | — |

Example 2

Co-doped Carbonized Aerogels 1.29 g (0.0094 mol) of potassium carbonate was added to a suspension of 2.9 g (0.018 mol) 2,4-dihydroxybenzoic acid in 100 ml of water. As the benzoic acid was neutralized, the solution cleared. Once neutralized, 2.98 g (0.054 mol) of 37% formaldehyde and 25 mg (0.178 mmol) of $K_2CO_3$, a base catalyst, were added to the reaction. The reaction mixture was stirred vigorously at room temperature for 30 minutes. The clear solution was then poured into glass vials, which were sealed and allowed to sit at room temperature for 12 hours before being cured at 80° C. for three days during which time dark orange wet organic gels formed.

The wet gels were treated twice with de-ionized water, treated three times with a 0.1 M solution of copper nitrate, $Co(NO_3)_2$, resulting in organic gels containing $Co^{2+}$ ions. Following the ion exchange process, the gels were treated with de-ionized water twice, then treated three times with acetone to remove the water and then dried using carbon dioxide supercritical extraction. These gels were then carbonized at 1050° C. under a nitrogen atmosphere for 1 hour. This process produced a Co-doped carbonized aerogel material.

Example 3

Ni-doped Carbon Aerogels 1.29 g (0.0094 mol) of potassium carbonate was added to a suspension of 2.9 g (0.018 mol) 2,4-dihydroxybenzoic acid in 100 ml of water. As the benzoic acid was neutralized, the solution cleared. Once neutralized, 2.98 g (0.054 mol) of 37% formaldehyde and 25 mg (0.178 mmol) of $K_2CO_3$, a base catalyst, were added to the reaction. The reaction mixture was stirred vigorously at room temperature for 30 minutes. The clear solution was then poured into glass vials, which were sealed and allowed to sit at room temperature for

The invention claimed is:

1. A process for synthesizing metal-doped organic gels comprising:
    polymerizing a metal salt of a hydroxylated benzene or a hydroxylated benzene derivative with an aldehyde, wherein said polymerization is a sol-gel polymerization, to form a first metal-doped, wet, organic gel; and
    exchanging the metal ion contained in the first metal-doped, wet, organic gel for at least one second metal ion using an ion exchange process to form a second metal-doped, wet, organic gel.

2. The process recited in claim 1, further comprising:
    drying said second metal-doped, wet, organic gel by supercritical solvent extraction to form a dried metal-doped organic gel.

3. The process recited in claim 2, wherein said drying is accomplished by either supercritical solvent extraction to form a metal-doped organic aerogel or by evaporation to form a metal-doped organic xerogel.

4. The process recited in claim 1, wherein the metal counter ion of said metal salt is selected from the group consisting of Group IA metals.

5. The process recited in claim 1, wherein the second metal counter ion of said second metal-doped, wet, organic gel is selected from the group consisting of first row transition metals, second row transition metals and third row transition metals.

6. The process recited in claim 1, wherein the metal counter ion of said metal salt is sodium or potassium.

7. The process recited in claim 1, wherein the second metal counter ion of said second metal-doped, wet, organic gel is copper, cobalt or nickel.

8. The process recited in claim 1, wherein the aldehyde is formaldehyde.

9. The process recited in claim 2, further comprising: carbonizing said dried metal-doped organic gel.

10. The process recited in claim 9, wherein the carbonizing is accomplished by heating the dried metal doped organic gel at a temperature of about 1050° C. for about 1 hour.

11. The process recited in claim 9, wherein the metal counter ion of said metal salt is selected from the group consisting of Group IA metals.

12. The process recited in claim 9, wherein the second metal counter ion of said second metal-doped organic gel is selected from the group consisting of first row transition metals, second row transition metals and third row transition metals.

13. The process recited in claim 9, wherein the metal counter ion of said metal salt is sodium or potassium.

14. The process recited in claim 9, wherein the second metal counter ion of said second metal-doped organic gel is copper, cobalt or nickel.

* * * * *